Patented Apr. 29, 1947

2,419,684

UNITED STATES PATENT OFFICE 2,419,684

REFRACTORY AND INSULATING MATERIALS

Norman A. Johnson, Lancaster, and Paul H. Stern, Penn Township, Lancaster County, Pa., assignors to Armstrong Cork Company, Lancaster, Pa., a corporation of Pennsylvania No Drawing. Application July 21, 1943, Serial No. 495,622

8 Claims. (Cl. 106—64)

This invention relates to refractory and insulating ceramic materials and a method of forming such materials and is more particularly concerned with improvements in grog-containing castable and trowelable slips which are employed in the production of such materials. An object of this invention is to provide a castable slip of this type having improved workability and which does not excessively shrink when dried or dried and fired and which forms an improved product having among other desirable features a relatively high modulus of rupture.

It is a common practice to make cast refractory and insulating materials by first mixing grog particles with one or more binder ingredients and water to form a slip, then shaping this slip by casting, trowelling or other suitable methods and thereafter drying or drying and burning the cast slip. The slip may be cast in molds of the proper regular or irregular shape to form bricks or other shapes, or may be trowelled into irregular cavities such as are formed in furnace linings. The term "castable slip" is intended to include all such castable and trowelable slips. The grog particles may be considered the skeleton of the final shape and this skeleton is bound together by the binder, such as clay or a mixture of clay and hydraulic cement. Various difficulties are encountered in shaping these prior art slips by casting or trowelling because of the so-called "shortness" of the slips. Additional water only partially overcomes this shortness as the slip will only retain a limited amount of water and even though retained, it may cause excessive shrinking during the drying or drying and burning treatment. The workability or fatness of such a slip may be increased by the addition of a relatively large amount of a colloidal clay, such as bentonite, but the bentonite causes excessive shrinking when used in an amount sufficient to impart the desired fatness to the slip. A relatively large amount of a wetting agent also improves the workability of the slip but when used in an amount sufficient to impart the desired workability, the final product is relatively weak and friable.

We have discovered that the addition of both an unusually small amount of an inorganic suspending colloid and a minute quantity of a wetting agent greatly improves the workability of the slip, tends to increase the modulus of rupture of the final product, without causing an excessive shrinkage and reduction in the compressive strength of the final product. These amounts of inorganic suspending colloid and wetting agent are apparently coactive as they are not sufficiently effective when used separately to impart the desired workability and as one ingredient tends to balance the disadvantages of the other ingredient. This combination of additional ingredients not only improves the workability of the slip when a like amount of water is employed, but tends to increase the amount of water which the slip will retain and, in general, impart other desirable characteristics to the slip and/or the product.

Any inorganic suspending colloid having the property of increasing the workability, plasticity and flowability of castable, grog-containing slips of the type herein set forth may be used. A representative inorganic suspending colloid is bentonite which is a finely divided clay containing appreciable quantities of montmorillonite or beidellite. Another suitable suspending colloid is sold under the trade-mark of "Eyrite" having the following approximate chemical analysis: $CO_2$ 19.24%; $MgO$ 13.68%; $CaO$ 31.91%; $R_2O_2$ 0.53%; $SiO_2$ 27.70%; and loss upon ignition (including 19.24% $CO_2$) 26.1%. "Eyrite" is highly colloidal and it has the property of acting as a suspending colloid, but cannot be properly termed a clay as it apparently does not contain any hydrous aluminum silicate. Bentonite is somewhat more effective and desirable than "Eyrite."

The suspending colloid may be employed in an amount ranging from .25% to 1.5% by volume and is preferably used in an amount ranging from .5% to 1% by volume. Smaller amounts of suspending colloid are not appreciably effective in improving the workability and larger amounts tend to cause too high a shrinkage. Unless otherwise set forth the weight or volume of the water has not been considered when computing the percentages so that the percentages are based on the volume of what may be considered the dry ingredients.

Any wetting agent may be used—a wetting agent being considered a material which reduces the surface tension of water. We have found the following wetting agents which are described in an article published in the January, 1943 issue of "Industrial and Engineering Chemistry," pages 126 to 130, to be effective: "Naconol-N.R."—a sodium alkyl aryl sulfonate; "Aerosol-O.S."—which is an isopropyl naphthalene sodium sulfonate; "Santomerse D."—which is an alkylated aryl sulfonate; and "M.P.-189"—which is a sodium hydrocarbon sulfonate. We have found that these wetting agents may be used in an amount ranging from about .125% to about .01% by volume, though it is preferred to employ them in an amount ranging from about .05% to about .0125%. In general, a smaller amount of any one of these wetting agents does not impart the desired degree of workability and a larger amount tends to cause the product to be relatively weak and friable. The amount of wetting agent is influenced by its composition and effectiveness. It is contemplated that a smaller amount of a more effective wetting agent or a larger amount of a less effective wetting agent would be an equivalent and fall within the spirit and scope of our invention, as it is the effectiveness of the wetting agent which controls the amount employed.

One well-known method of testing the efficiency of wetting agents is the Draves-Clarkson test described in their article in the "American Dyestuff Reporter," volume 20, page 201 (1931). The test essentially consists in determining the time required for a 5 gram skein of two-ply unbleached cotton yarn loaded with a 1½ gram weight to sink in a graduate containing 500 cc. of aqueous solution. Comparison of wetting power is usually made by comparing the quantity of wetting agent in grams per liter which causes the skein to sink in 25 seconds. We have found a wetting agent which causes the skein to sink in 25 seconds when at a concentration of 1.7 grams per liter provides slips of excellent workability and trowelability when employed in an amount within either of the ranges above set forth. Thus, to determine the amount of a wetting agent which should be employed to provide a workable and trowelable slip, it is only necessary to multiply either of these ranges by the factor $$\frac{X}{1.7}$$

where X equals the amount of wetting agent in grams per liter required to cause sinking of a cotton skein in 25 seconds when tested according to the Draves-Clarkson test. For example, if a certain wetting agent requires a concentration of 2.5 grams per liter to cause sinking of the skein in 25 seconds, then the factor $$\frac{X}{1.7}$$

equals 1.5 and this wetting agent may be used in an amount of from .1875% to .015% and is preferably used in an amount of from .075 to .01875% by volume in castable slips as hereinbefore described.

The grog may comprise particles of any previously burned or vitrified clay or essentially clay material. The inorganic suspending colloid and wetting agent are more noticeably effective in improving the workability when the grog includes a substantial amount of particles which are not larger than about ½ inch and not small enough to pass through a 30 mesh screen. If all of the grog particles are larger than ½ inch, the workability is not materially or noticeably increased. If all of the grog particles are in the form of fine dust, the slip is plastic and workable without the addition of both a suspending colloid and a wetting agent and no great improvement in workability is noticed, though there may be some improvement in workability of the slip and in the quality of the product. In practice, the grog particles usually will vary in size over a relatively wide range and our invention is applicable to all grogs, regardless of the particle size, especially as it is desirable to employ these ingredients in the amounts set forth even though the improvement in workability is slight.

The improvement in workability is, in general, more pronounced when the grog particles are somewhat porous in nature, though the invention is not limited to such grogs. A great improvement in workability is noted when the grog comprises a crushed foamed fire clay or an insulating refractory material which is of porous nature. An insulating refractory material, such as an insulating firebrick, is defined as a firebrick having a low thermal conductivity and having a bulk density of less than 70 pounds per cubic foot, suitable for lining industrial furnaces. The nature of the grog will depend on the use of the final product.

Any ceramic raw material which forms a binder upon the addition of water may be employed and we have found clay, fire clay, hydraulic cement, or a mixture of fire clay and hydraulic cement to be desirable binders. The term "ceramic" is intended to designate any nonmetallic, earthy material and the term "ceramic binder" designates such a material which possesses binding properties upon the addition of water followed by drying or drying and firing. The nature and constituents of the binder will depend in part upon the use of the dried or dried and fired product.

Having broadly discussed our invention, the following examples, in which the percentages are by volume unless otherwise set forth, are intended to illustrate, but not to limit our invention to the exact proportions or ingredients except as set forth in the claims.

*Example I (135–A)*

| | Percent |
|---|---|
| Insulating refractory grog (30 mesh to ½ inch) | 79.5 |
| Fire clay (West Darlington clay) | 4 |
| Lumnite cement | 16 |
| Bentonite | .5 |
| Wetting agent | .02 |

The grog particles are prepared by crushing insulating refractory material formed by burning a mixture of fire clay and organic material, in which the organic material is consumed during burning to leave a porous product having a density of less than 70 pounds per cubic foot. A castable slip having excellent workability may be formed by mixing 2702 grams of the above ingredients with 1200 cc. of water. A slip of this formulation may be cast in a mold of suitable shape, dried and burned to form an insulating refractory shape having a relatively high modulus of rupture and relatively low volumetric shrinkage. It may also be trowelled into a cavity and dried or dried and burned.

Comparisons were made by omitting the wetting agent and using either bentonite or "Eyrite" in various amounts in the above formula and checking the workability of the slips. It was found that even the use of a larger amount of both water and suspending colloid did not impart as good workability to the slip and there were noticeable increases in the volumetric shrinkage during drying and burning.

*Example II*

| | Percent |
|---|---|
| Grog particles (same as in Example I) | 80 |
| Fire clay | 2.8 |
| Lumnite cement | 16.5 |
| Bentonite | .75 |
| Wetting agent | .25 |

A castable slip having excellent workability was formed by mixing 2736 grams of this castable mixture with 1210 cc. of water.

In preparing castable slips for use as an insulating refractory in lining furnaces and for other purposes from grog, fire clay and lumnite cement, we have found that the ingredients may be combined in the following proportions:

| Possible Range | Ingredients | Preferred Range |
|---|---|---|
| Per cent | | Per cent |
| 70 to 85 | insulating refractory grog | 76 to 82 |
| 2 to 7 | fire clay | 2.5 to 5 |
| 12 to 25 | lumnite cement | 14 to 18 |
| .25 to 1.5 | suspending colloid | .5 to 1 |
| .125 to .01 | wetting agent | .05 to .0125 |

The above mixtures may be mixed with water to form castable slips having excellent workability and upon drying and firing form products having improved highly desirable characteristics as insulating refractory materials. The quantity of water will vary with the proportions of the ingredients and in general, will be the minimum amount of water which produces satisfactory workability.

*Example III*

| | Per cent |
|---|---|
| Foamed kaolin grog (30 mesh to ½ inch) | 79.5 |
| Fire clay | 4 |
| Lumnite cement | 16 |
| Bentonite | .5 |
| Wetting agent | .02 |

Foamed kaolin grog essentially comprises calcined kaolin and contains a relatively large amount of cells, so that it has a relatively low specific gravity and comes within the scope of the term "insulating refractory material."

A castable slip having excellent workability and improved characteristics was prepared by mixing 3115 grams of this material with 1350 cc. of water.

*Example IV*

| | Per cent |
|---|---|
| Foamed kaolin grog | 79.5 |
| Lumnite cement | 16 |
| Ball clay | 4 |
| Bentonite | .5 |
| Wetting agent | .02 |

The above grog had the following size range:

| U. S. Standard Screen No. | % by Weight Retained on Screen |
|---|---|
| 4 | 12.3 |
| 10 | 12.6 |
| 16 | 4.1 |
| 30 | 11.9 |
| 50 | 27.3 |
| 80 | 10.1 |
| pan | 21.4 |
| Total | 99.7 |

A slip was prepared by mixing 4002 grams of the above mixture with 1860 cc. of water. This slip had noticeably improved workability even though containing a high percentage of very fine grog particles.

*Example V*

| | Per cent |
|---|---|
| Grog (30 mesh to ½ inch) | 79.5 |
| Ball clay | 4 |
| Lumnite cement | 16 |
| Bentonite | .52 |
| Wetting agent | .02 |

The grog in this example was prepared by crushing a brick selected at random from those of the type generally used in the construction of houses and the like.

A slip was prepared by mixing 4455 grams of the above mixture with 840 cc. of water. The slip had excellent workability, formed a product having a relatively uniform and smooth surface without any large voids.

For the purpose of comparison, another slip was prepared according to Example V, but without any suspending colloid or wetting agent. This comparative slip not only was difficult to work and lacking in placticity and trowelability, but the surface of the resultant product contained numerous surface voids and gave the appearance of consisting of large lumps or particles partially held together by a deficient amount of binder.

*Example VI*

| | Per cent |
|---|---|
| Foamed kaolin grog | 79.5 |
| Ball clay | 4 |
| Lumnite cement | 16 |
| Bentonite | .5 |
| Wetting agent | .02 |

This grog comprised 20% by volume of particles ranging from 30 mesh to ½ inch and 80% by volume of particles smaller than 30 mesh screen size.

The slip produced from 3486 grams of the above ingredients and 1490 cc. of water had excellent trowelability.

A comparative slip was prepared without the suspending colloid and wetting agent of Example VI. Only fair trowelability was obtained even with an additional quantity of water. These comparative slips are also illustrative of other pecularities or differences which have been noted upon the addition of the inorganic suspending colloid and wetting agent. For instance, after the different slips have been trowelled or cast, there is often a pronounced difference between the behavior of the water content. In the slip not containing a suspending colloid and wetting agent, the water tends to drain off and/or collect at the surface, that is, the water tends to separate from the other ingredients. The presence of a suspending colloid and wetting agent prevents or tends to prevent this separation of the water. This phenomenon may account for the fact that the suspending colloid and wetting agent tend to minimize the shrinkage. In any event, the suspending colloid and wetting agent apparently tend to produce a more uniform and stable slip and their use may be desirable even though the slip would have satisfactory workability if these two ingredients were not present.

It is often desirable to prepare a mixture of any of the above ingredients including the suspending colloid and wetting agent and then ship the mixture to the consumer, who adds water to form the castable slips. Accordingly, the term "castable mix" is employed to generically designate the mixture of ingredients which upon the addition of water will form a castable and trowelable slip and also to designate the castable slips formed by adding water to the other ingredients.

The use of this relatively small amount of suspending colloid and minute quantity of wetting agent produces fatter slips having improved workability. These ingredients also tend to increase the modulus of rupture of the final product. While these ingredients do not obviate shrinkage completely during drying or drying and burning, such shrinkage is relatively low and does not affect adversely the characteristics of the final product.

Having discussed our invention in detail, it is obvious that various modifications may be made in the proportions and ingredients without departing from the spirit or scope of the invention.

We claim:

1. A castable insulating refractory mix comprising from about 70% to about 85% by volume of insulating refractory grog particles; from about 2% to 7% by volume of raw fire clay; from about 12% to 25% by volume of lumite cement; from about .25% to about 1.5% by volume of an inorganic suspending colloid; and from about .125% to about .01% by volume of a wetting agent.

2. A castable insulating refractory mix comprising from about 76% to about 82% by volume of insulating refractory grog particles; from about 16.5% to about 23% by volume of binder including fire clay and lumnite cement; from about .5% to about 1% by volume of an inorganic suspending colloid; and from about .05% to about .0125% by volume of wetting agent.

3. A castable insulating refractory mix comprising about 79.5% by volume of insulating refractory grog particles; about 20% by weight of binder including fire clay and lumnite cement; about .5% by weight of bentonite; and about .02% by weight of wetting agent.

4. A castable insulating refractory mix comprising from about 70% to about 85% by volume of insulating refractory grog particles; from about 2% to 7% by volume of raw fire clay; from about 12% to 25% by volume of lumnite cement; from about .5% to about 1% by volume of bentonite; and from about .05% to about .0125% by volume of a wetting agent.

5. A castable insulating refractory mix comprising from about 76% to about 82% by volume of insulating refractory grog particles; from about 16.5% to about 23% by volume of binder including fire clay and lumnite cement; from about .5% to about 1% by volume of bentonite; and from about .05% to about .0125% by volume of a wetting agent.

6. A castable insulating refractory mix comprising from about 76% to about 82% by volume of insulating refractory grog particles; from about 16.5% to about 23% by volume of binder including fire clay and hydraulic cement; from about .5% to about 1% by volume of an inorganic suspending colloid; and from about .05% to about .0125% by volume of wetting agent.

7. A castable insulating refractory mix comprising from about 70% to about 85% by volume of insulating refractory grog particles; from about 14% to 32% by volume of binder including fire clay and hydraulic cement; from about .25% to about 1.5% by volume of an inorganic suspending colloid; and from about .125% to about .01% by volume of a wetting agent.

8. A castable insulating refractory mix comprising from about 70% to about 85% by volume of insulating refractory grog particles; from about 2% to 7% by volume of raw fire clay; from about 12% to about 25% by volume of hydraulic cement; from about .5% to about 1% by volume of bentonite; and from about .05% to about .0125% by volume of a wetting agent.

NORMAN A. JOHNSON.
PAUL H. STERN.

REFERENCES CITED

The following references are of record in the file of this patent:

UNITED STATES PATENTS

| Number | Name | Date |
|---|---|---|
| 2,171,290 | Hobart | Aug. 29, 1939 |
| 2,073,138 | Bole | Mar. 9, 1937 |

Certificate of Correction

Patent No. 2,419,684. April 29, 1947.

NORMAN A. JOHNSON ET AL.

It is hereby certified that errors appear in the printed specification of the above numbered patent requiring correction as follows: Column 5, line 64, after the word "grams" strike out *of*; column 6, line 14, for "placticity" read *plasticity*; column 7, line 12, claim 1, for "lumite" read *lumnite*; and that the said Letters Patent should be read with these corrections therein that the same may conform to the record of the case in the Patent Office.

Signed and sealed this 17th day of June, A. D. 1947.

[SEAL]

LESLIE FRAZER,
*First Assistant Commissioner of Patents.*